United States Patent
Labarre et al.

(10) Patent No.: US 8,527,714 B2
(45) Date of Patent: Sep. 3, 2013

(54) SECURE AVIONICS EQUIPMENT AND ASSOCIATED METHOD OF MAKING SECURE

(75) Inventors: Etienne Labarre, Paris (FR); Philippe Vogtenberger, Paris (FR)

(73) Assignee: Sagem Defense Securite, Paris (FR)

(*) Notice: Subject to any disclaimer, the term of this patent is extended or adjusted under 35 U.S.C. 154(b) by 197 days.

(21) Appl. No.: 13/128,873

(22) PCT Filed: Nov. 6, 2009

(86) PCT No.: PCT/EP2009/064735
§ 371 (c)(1),
(2), (4) Date: May 11, 2011

(87) PCT Pub. No.: WO2010/054983
PCT Pub. Date: May 20, 2010

(65) Prior Publication Data
US 2011/0219458 A1   Sep. 8, 2011

(30) Foreign Application Priority Data
Nov. 17, 2008   (FR) .................................. 08 57783

(51) Int. Cl.
*G06F 12/00* (2006.01)
(52) U.S. Cl.
USPC ......................................................... 711/152
(58) Field of Classification Search
None
See application file for complete search history.

(56) References Cited

U.S. PATENT DOCUMENTS

| | | | | |
|---|---|---|---|---|
| 5,452,431 A | * | 9/1995 | Bournas | 711/115 |
| 6,801,769 B1 | * | 10/2004 | Royalty | 455/431 |
| 7,415,730 B2 | * | 8/2008 | Watanabe | 726/26 |
| 8,341,298 B2 | * | 12/2012 | Wilber et al. | 709/249 |
| 2009/0138963 A1 | * | 5/2009 | Sato et al. | 726/17 |
| 2010/0021174 A1 | * | 1/2010 | Truong | 398/101 |

OTHER PUBLICATIONS

M. Younis et al., Robust Approach for Supporting Inter-Application Communication and Device Handling in Integrated Modular Avionics, Proceedings of the 15th International Conference on Parallel and Distributed Computing Systems (PDCS 2002), [Online], Sep. 2002, URL: http://www.csee.umbc.edu/ {younis/Publications//PDC2002/Younis_PDCS2002.pdf> Louisville, KY.
Arinc: "AFDX/ARINC 664 Tutorial (1 500-049)" Internet Citation, [Online] URL: http://www.acalmicrosystems.co.uk/whitepapers/sbs8.pdf?PHPSESSID=bd030f1b97f284d41ec00cf1ea2d5226>, Apr. 2007.
S. S. Mukherjee et al., Making Network Interfaces Less Peripheral, Computer, IEEE Service Center, Oct. 1, 1998, pp. 70-76, vol. 31, No. 10, Los Alamitos, CA, USA.
R. L. Alena et al., Communications for Integrated Modular Avionics, Aerospace Conference, 2007 IEEE, IEEE, Mar. 3, 2007, pp. 1-18, Piscataway, NJ, USA.
L. Gagea et al., Designing Devices for Avionics Applications and the Do-254 Guideline, Semiconductor Conference, 2008. CAS 2008. International, IEEE, Oct. 13, 2008, pp. 377-380, Piscataway, NJ, USA.

* cited by examiner

*Primary Examiner* — Hiep Nguyen
(74) *Attorney, Agent, or Firm* — Blakely Sokoloff Taylor & Zafman

(57) ABSTRACT

This invention relates, according to a first aspect, to electronic equipment comprising a processor (2), a memory (11) and a communication module (3) ensuring an interface with an avionics data network. The communication module (3) and the processor (2) are embedded within a microcontroller (1) so that the memory (11) is shared between the processor and the communication module. The electronic equipment also includes a module for monitoring the accesses to the memory (17) which are configured so as to detect an access of the communication module (3) into an unauthorized address area (12) of the memory (11). According to a second aspect, the invention relates to a method of making a processor secure against the failures of a complex peripheral.

11 Claims, 3 Drawing Sheets

SECURE AVIONICS EQUIPMENT AND ASSOCIATED METHOD OF MAKING SECURE

This is a non-provisional application claiming the benefit of International Application Number PCT/EP2009/064735 filed Nov. 6, 2009.

BACKGROUND OF THE INVENTION

The field of the invention is that of avionics equipment.

1. Field of the Invention

The invention relates more particularly to aircraft on-board devices which provide a communication interface with an avionics network designed to serve as a medium for the aircraft's internal communications, for example a communication interface for an ARINC 664 avionics network (particularly an AFDX or Aviation Full Duplex network), or else an interface of the CAN Bus, USB or HDLC type.

2. Description of Related Art

Avionics systems today include increasingly intelligent remote devices of the sensor or actuator type. In particular, these are critical flight control devices, for example electric linear actuators which are not only controlled by a central controller but are also capable of generating reports directed to the central controller.

Avionics equipment thus generally fills a critical function in the sense that the provision of undetected erroneous information can have catastrophic results for the safety of the aircraft and of its passengers. Criticality is defined within the application field of the invention in particular by the following aeronautical reference documents: CS25.1309/ARP-4754/DO-254/DO-178B.

Today it is normal practice to develop a specific electronic component of the ASIC (or FPGA, PLD) type to fulfill the function of an AFDX interface for avionics equipment, this component being linked to a processor which carries out the other functions—particularly the critical functions—of the equipment. This solution, however, proves to be complex and costly to the extent that the ASIC component must be developed with the aim of ensuring a good level of design assurance (level A and B of specification DO-254).

BRIEF SUMMARY OF THE INVENTION

The object of the invention is to offer a technique that allows this disadvantage to be avoided, by making it possible to provide the AFDX interface function in a simpler and less costly fashion while still ensuring the safety of the avionics system.

To this end, the invention proposes electronic equipment including a processor, a memory and a communication module providing an interface with an avionics data network, wherein the communication module and the processor are embedded within a microcontroller such that the memory is shared between the processor and the communication module, and wherein it also includes a memory access monitoring module for detecting access by the communication module to an unauthorized address area in memory.

Certain preferred, but not limiting aspects of this equipment are as follows:
 the monitoring module is configured to trigger an interrupt and a reset of the microcontroller in the event of write access by the communication module to the unauthorized address area;
 the unauthorized address area corresponds to an address area reserved for the software running on the processor;
 the unauthorized address area is pre-defined during the design of the electronic equipment;
 the processor and the communication module are connected to the memory through a common bus;
 the processor includes a memory management unit responsible for access to main memory requested by the processor;
 the communication module provides an AFDX interface with the avionics network;
 the processor is configured to calculate a checksum for the data frames leaving the communication module before their transmission over the avionics network;
 the monitoring module is a simple electronic device within the meaning of specification DO-254; and
 the processor is programmed to carry out a critical function within the meaning of specification DO-254.

According to a second aspect, the invention relates to a method for securing electronic equipment including a processor and a communication module providing an interface with an avionics data network, the processor and the communication module being embedded within a microcontroller such that they share the same memory, including the implementation of monitoring of access to the shared memory to detect an access by the communication module in the unauthorized address area.

BRIEF DESCRIPTION OF THE DRAWINGS

Other features, goals and advantages of the present invention will be more apparent from reading the following detailed description of the preferred embodiments thereof, given as non-limiting examples and with reference to the appended drawing in which.

DETAILED DESCRIPTION OF THE INVENTION

According to a first aspect, the invention relates to equipment including a processor, a memory function and a communication module providing a communication interface with an avionics network.

Within the framework of the invention, it is proposed to combine the function of interfacing to the avionics network (an AFDX network in the non-limiting embodiment of the invention to be considered in what follows) with the other functions of the avionics equipment on a single component of the microcontroller type, the AFDX function being delegated to a complex internal peripheral specific to the microcontroller.

The equipment according to a first aspect of the invention also includes a communication module (which is assigned the AFDX interface function) and a processor (which is assigned the other functions, particularly the critical ones, of the equipment), both embedded within a single component of the microcontroller type.

Figure 1:
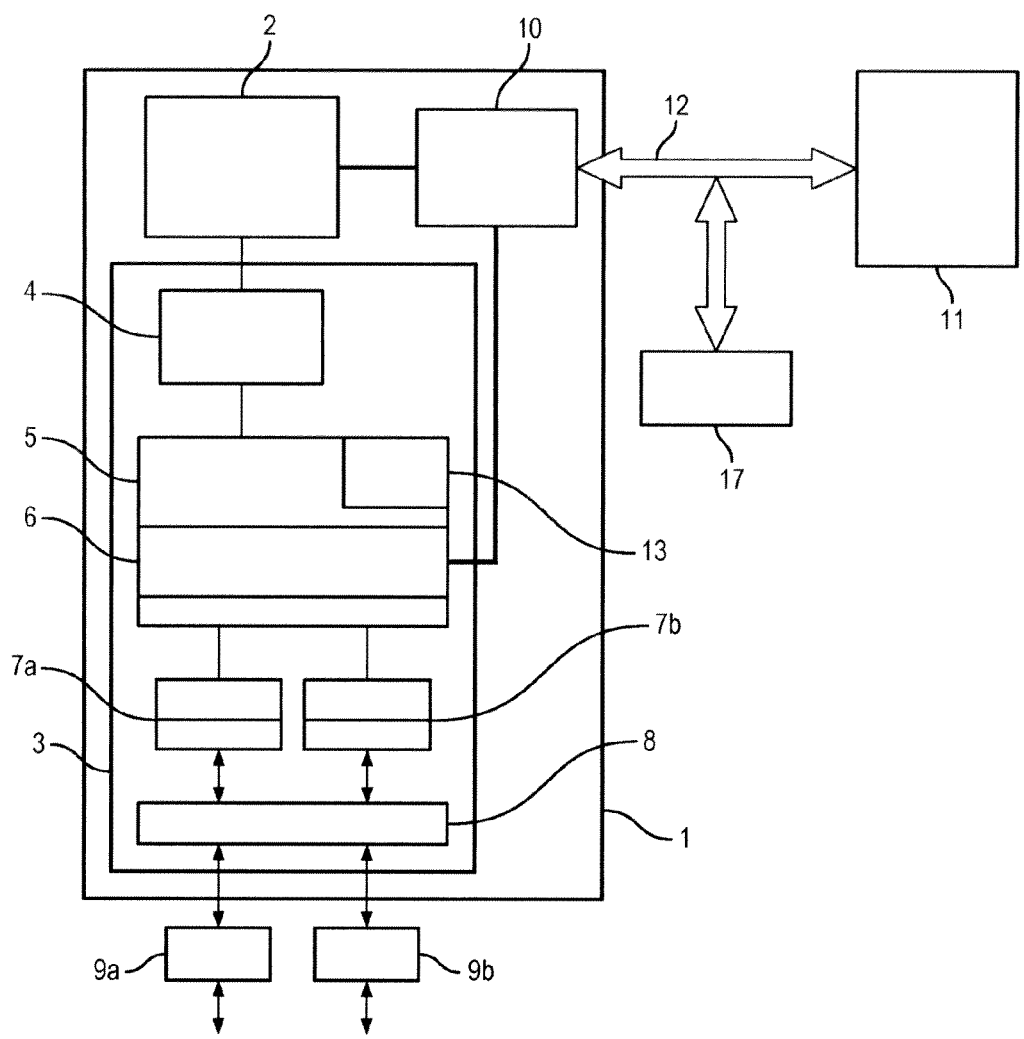
FIG. 1 is a schematic representing equipment conforming to a possible embodiment of the first aspect of the invention.

Shown in FIG. 1 is a flowchart of avionics equipment according to the first aspect of the invention. The equipment includes in particular a microcontroller 1 combining a processor core 2, a communication module 3 designed to provide an interface with an avionics network, and an interface unit 10 incorporating in particular a memory controller and a bus arbiter.

The microcontroller 1 is for example the Freescale company's MPC 8270 microcontroller. In the terminology associated with this MPC 8270 microcontroller, the processor is called the core processor (PowerPC Core), the communication module is called the Communication Processor Module. It will be noted that in FIG. 1, only the components of the microcontroller 1 necessary for understanding the invention have been shown.

The communication module 3 includes in particular a memory 4 of the RAM type, for example DPRAM (Dual Ported Random Access Memory), and a communication processor 5 provided with a microprocessor and a memory 6 of the ROM or RAM type in which is stored a microcode defining the operation of the communication module 3.

In the embodiment presented here, two Ethernet controllers 7a, 7b (typically fast communication controllers or FCCs) in the communication module 3 are used to perform interface operations with the AFDX avionics network. The Ethernet controllers 7a, 7b communicate with transceiver modules 9a, 9b (type LXT973 for example in the case of the AFDX bus) via an interface 8 (for example a media-independent interface or MII as specified by the IEEE 802.3 standard, particularly an FCC channel MII interface).

The system interface unit 10 is connected to a main memory 11, for example a RAM type memory, through a memory bus 12.

It should be recalled that the processor 2 also includes a memory management unit (MMU) responsible for the access to the main memory 11 requested by the processor 2 and which ensures the necessary degree of security in the field of application of the invention within the framework of the operation of the software on the processor core 2.

Overall operation is as follows:
the AFDX data frames are written or read by the processor 2 in the main memory 11;
the AFDX data frames are written or read by the communication module 3 in the main memory 11 via direct memory access (DMA) initiated by the communication module 3;
the processor 2 and the communication module 3 share the bus 12 under the supervision of the bus arbiter of the system interface unit 10;
transfers are checked by a frame descriptor stored in the main memory. More specifically, for each of the Ethernet controllers 7a, 7b (designated FCC1 and FCC2 in FIG. 2), the frames are organized in the communication module within the RAM type memory 4 so as to correspond to a buffer descriptor table ("BD table" in FIG. 2) in the main memory 11, the buffer descriptor table including in particular a pointer field pointing to a buffer table ("buffer table" in FIG. 2) in the main memory 11 where an AFDX frame, received or to be transmitted, is stored;
only a pointer to the address in the main memory where the buffer descriptor table is located is stored in the RAM memory 4 of the communication module 3 (not protected by an error correction code or ECC).

Within the field of application of the invention, the processor 2 of the microcontroller 1 (for example the Freescale MPC 8270 microcontroller) requires no special justifications: from the certification point of view, it is in fact considered that processors are covered by the verifications of the software that they support (DO 178B standard).

On the other hand, there is no design assurance guarantee for the communication module 3. In fact, the microcode defining the operation of the communication module is developed by the designer of the microcontroller. The designer, however, contributes no support for the justification of the communication module, neither on the hardware side nor on the microcode side, so the communication module 3 is a component whose development assurance level is unknown due to lack of information; consequently, the "complex component" justification within the meaning of avionic certifications is difficult to obtain.

One of the problems to be resolved is then to guarantee that anomalies and failures of the communication module 3 will not have a catastrophic effect on the safety of the system.

In fact, as seen earlier, the processor 2 and the communication module 3 are connected to the main memory 11 through a common bus 12. As a result, a failure mode of the communication module 3 could lead to undesired access to the memory 11, resulting in alterations to the data or the code used by the processor 2 which are stored in the memory 11. If the processor 2 accomplishes a critical function, this failure mode can have a catastrophic effect on the safety of the avionics system, because the processor 2 has no means of detecting such a corruption of its code or of its data.

An effort is therefore made to prevent such a failure mode of the communication module 3 from having an effect on the safety of the avionics system.

It will be noted here that the reception of AFDX frames is not described in what follows, inasmuch as the loss of AFDX data or the reception of erroneous AFDX data is not considered to have any effect on the safety of the avionics system.

Figure 2:
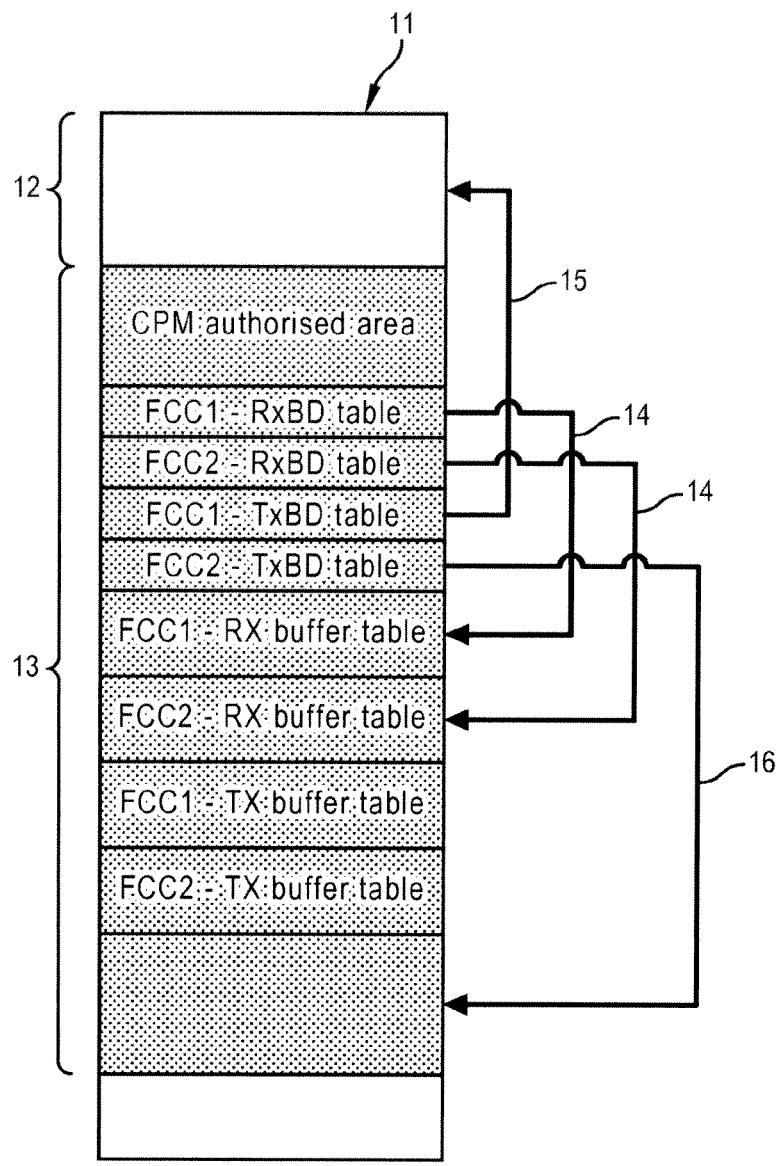
FIG. 2 illustrates memory accesses by the communication module of an equipment conforming to a possible embodiment of the first aspect of the invention.

The main memory 11 is shown on FIG. 2 as seen by the communication module 3. The memory 11 is divided into two blocks:
an unauthorized area 12: an access by the communication module 3 in this area 12 corresponds to an error due to a malfunction of the communication module 3 or to corruption of a pointer;
an authorized area 13, which contains data processed by the communication module 3.

These areas in particular must be defined in advance, during the design of the electronic equipment.

Preferably, the unauthorized area 12 of the memory 11 corresponds to elements of the memory 11 which are reserved for the processor 2. The program and the data used by the processor 2 are thus intended to be stored in this unauthorized area 12.

On this FIG. 2 are shown:
by arrows bearing the reference number 14, a normal access by the data communication module 3 to the memory 11 in the authorized area 13;
by an arrow bearing the reference number 15, an abnormal access by the data communication module 3 to the memory 11, in the unauthorized area 12;
by an arrow bearing the reference number 15, an abnormal access by the data communication module 3 to the memory 11, in the authorized area 13, resulting from unexpected behavior or a corrupted pointer.

According to the invention, and with reference to FIG. 1, the equipment according to the first aspect of the invention also includes a module 17 monitoring access to the main memory 11 to detect an access by the communication module 3 in the unauthorized address area 12. The module 17 is thus configured to detect any abnormal access in the unauthorized area 12 of the main memory 11 (access bearing reference number 15 in FIG. 2). The module 17 allows implementation of a hardware monitoring mechanism, external to the microcontroller being monitored.

The module 17 monitoring access to the main memory 11 monitors the source of data to be written into the memory 11 and analyzes the storage addresses to detect any possible addressing by a component (here the communication module 3) in an unauthorized area.

Thus the module 17 monitoring access to the main memory 11 monitors the behavior of the communication module 3 as seen from the bus 12 shared by the processor 2 and the communication module 3.

The module 17 monitoring access to the main memory in particular can be configured to trigger an interrupt in the event of write access by the communication module 3 in the unauthorized address area 12. As for the processor 2, it can be configured to generate an exception when the monitoring module triggers an interrupt.

The module 17 can also be configured to trigger a reset of all processor 2 operation in the event of write access by the communication module 3 in the unauthorized address area 12. The communication function can also be reset in order to block the outward communication channel and prevent the transmission of any potentially erroneous data.

When the unauthorized area 12 corresponds to the code and data used by the processor 2, it is understood that the invention allows detection of the occurrence of a malfunction of the communication module 3 that is liable to cause corruption of the code and data used by the processor 2 and consequently to degrade the critical functions performed by the processor 2.

According to one possible embodiment, the module 17 monitoring access to the main memory 11 monitors the transaction code (TC) signal and the addresses of microcontrolist 1 and triggers an interrupt when the following logic equation is observed:

The transaction code corresponds to an access request by the communication module 3; AND The memory is addressed in Write mode; AND The memory area addressed is outside of the area 13 authorized for transactions coming from the communication module 3.

The memory access monitoring module 17 is preferably an especially simple programmable component (PLD or Programmable Logic Device component) developed to Level A of specification DO-254. It follows that the necessary development resources for this component are combinatorial logic, latches controlled by a single clock, without implementation of a state machine.

Figure 3:
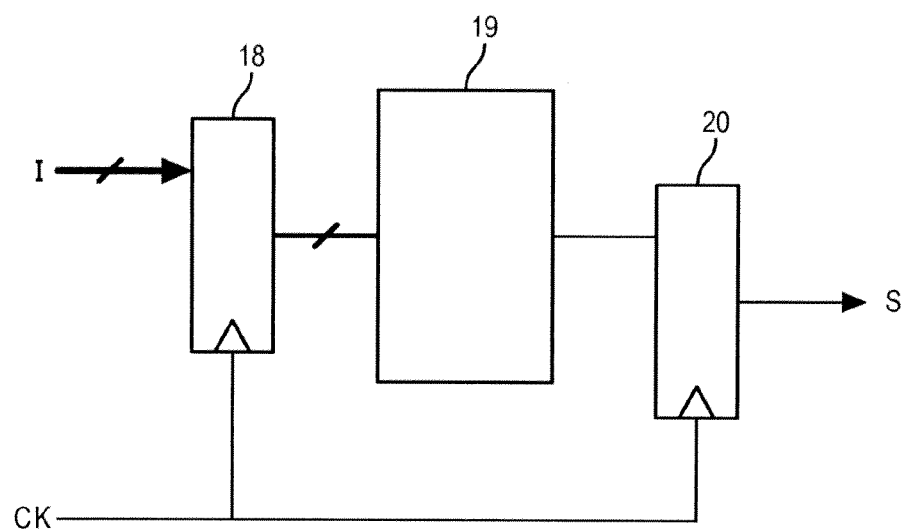
FIG. 3 is a flowchart representing a possible embodiment of a memory access monitoring module designed to be integrated into equipment according to the first aspect of the invention.

A functional chart of an embodiment of such a programmable component is shown in FIG. 3. The component includes a first flip-flop 18 receiving in particular at input I the signals transiting over the shared bus 12 between the microcontroller 1 and the main memory 11. A clock signal CK is supplied to the first flip-flop 18 in such a way that it duplicates the input at an edge of the clock signal (thus performing sampling of the signals transiting over the shared bus, particularly signals corresponding to access by the communication module to the main memory). The duplicate input is provided to an address decoding module 19 implementing, for example, the logic equation presented above to provide an output signal warning of a possible write access outside the authorized area. This output signal is provided to a second flip-flop 20 which duplicates it at a rate defined by the clock signal CK to provide an output signal S indicating a possible addressing error.

According to a preferred embodiment of the invention, a second safety mechanism is set up to prevent any failure of the communication module 3 from causing the transmission of erroneous AFDX frames. The aim in particular is to prevent any abnormal access by the communication module 3 to the authorized area 13 of the main memory 11 (access bearing reference number 16 in FIG. 2), for example as a result of design errors in communication module 3.

To this end, the processor 2 is configured to calculate a checksum (for example via a cyclic redundancy check or CRC) for data frames coming from the communication module 3, prior to their transmission over the avionics network. Frames corrupted by the communication module 3 can thus be detected by devices connected to the equipment according to the first aspect of the invention via the AFDX network.

Finally it will be understood that the invention is not limited to equipment according to the first aspect, but also extends to a method for securing electronic equipment comprising a processor and a communication module providing an interface with an avionics data network, the processor and the communication module being embedded within a microcontroller so as to share the same memory, the method including the implementation of monitoring of access to the shared memory to detect an access by the memory module in an unauthorized address area.

The invention claimed is:

1. Electronic equipment comprising:
a processor (2) programmed to execute a critical function as defined in a predetermined avionics specification,
a memory (11) and a communications module (3) ensuring an interface with an avionic data network, wherein the communications module (3) and the processor (2) are on board a microcontroller (1) such that the memory (11) is shared between the processor and the communications module, and
a common bus (12) linking the processor (2) and the communications module (3) to the memory (11), said common bus (12) being shared between the processor (2) and the communications module (3),
a surveillance module (17) for access to the memory (11) through the common bus (12), said surveillance module being configured to detect access of the communications module (3) in a non-authorised address zone of the memory (11).

2. The equipment as claimed in claim 1, in which the surveillance module (17) is configured to trigger interruption and reset to the initial states of the microcontroller in case of access of the communications module (3) in writing in the non-authorised address zone.

3. The equipment as claimed in claim 1, in which the non-authorised address zone corresponds to an address zone reserved for software being run on the processor.

4. The equipment as claimed in claim 1, in which the non-authorised address zone is previously defined during conception of the electronic equipment.

5. The equipment as claimed in claim 1, in which the processor and the communications module are connected to the memory by means of a common bus.

6. The equipment as claimed in claim 1, in which the processor comprises a memory management unit responsible for access to the memory required by the processor.

7. The equipment as claimed in claim 1, in which the communications module provides an AFDX interface with the network avionic.

8. The equipment as claimed in claim 1, in which the processor is configured to calculate a checksum for data frames coming from the communications module prior to their transmission over the network avionic.

9. The equipment as claimed in claim 1, in which the surveillance module is a simple electronic device in terms of the specification DO-254.

10. The equipment as claimed in claim 1, in which the processor is programmed to execute a function critical terms of the specification DO-254.

11. A process of securing electronic equipment comprising a processor programmed to execute a critical function as defined in a predetermined avionics specification, and a communications module ensuring an interface with a network of avionic data, the processor and the communications module being on board a microcontroller such that the processor and the communications module share the same memory, the process comprising using surveillance of access to the shared memory to detect access of the communications module in a non-authorised address zone of the shared memory.

* * * * *